Figure 1:
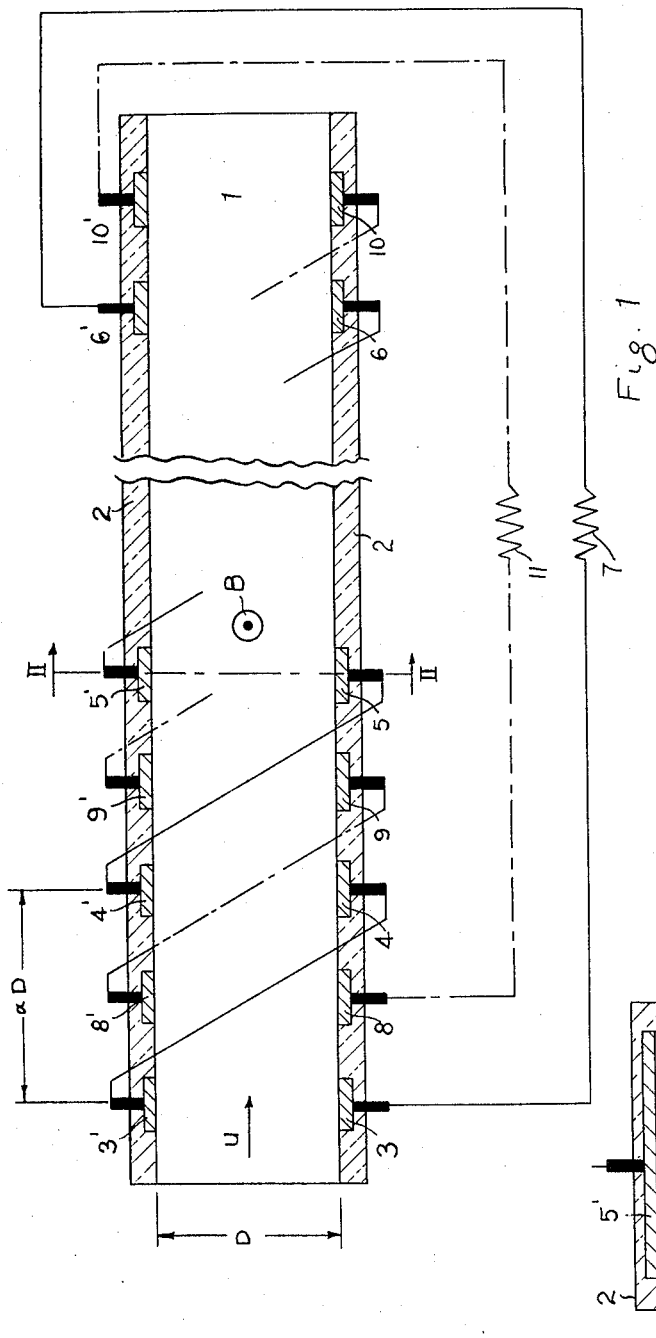

Dec. 27, 1966  L. S. DZUNG  3,294,990

MAGNETOHYDRODYNAMIC GENERATOR

Filed Dec. 31, 1962

INVENTOR.
Lang Shuen Dzung
BY
Pierce, Scheffler & Parker
Attorneys

United States Patent Office 3,294,990
Patented Dec. 27, 1966

3,294,990
MAGNETOHYDRODYNAMIC GENERATOR
Lang Shuen Dzung, Wettingen, Switzerland, assignor to Aktiengesellschaft Brown, Boveri & Cie, Baden, Switzerland, a joint-stock company
Filed Dec. 31, 1962, Ser. No. 248,546
Claims priority, application Switzerland, Jan. 17, 1962, 565/62
1 Claim. (Cl. 310—11)

This invention relates to electric generators and in particular to an improvement in the construction of electric generators of the magnetohydrodynamic type wherein heat energy is transferred directly into electrical energy without the use of any rotating machinery.

As is known, such a magnetohydrodynamic generator comprises a duct having a hot ionised gas flowing through it. If a magnetic field is produced perpendicularly to the direction in which the hot gas flows, an electrical voltage is induced perpendicularly to the direction in which the gas flows and perpendicularly to the direction of the magnetic field. An electric current may be taken off by means of suitable electrodes, and delivered in the form of electrical power to an external load resistance.

Together with the magnetic field, the current sets up a Lorentz-type breaking force against the gas flow, so that a correspondingly higher pressure gradient is required in the duct in order to maintain the flow. If the load resistance is changed, the current or voltage, or both, change as a rule. However, this also gives rise to a change in the braking force exerted by the magnetic field on the gas flow, and as a result a change in the pressure gradient in the duct. This interference with the gas flow must be compensated for by a corresponding change in the mass gas current, for example by regulating the speed of a compressor which supplies the gas. However, while the braking force changes instantaneously with a change in load, the effect of regulating the mass gas current becomes noticeable only in delayed fashion, since the compressor exhibits a certain amount of mechanical inertia, and at the instant when regulation is carried out the gas masses act as a storage quantity, and therefore as a delay member. This imposes very stringent requirements on the regulator system, with a correspondingly large expenditure on regulator devices.

The purpose of the invention is to disclose a magnetohydrodynamic generator wherein changes in the load resistance have a required definite effect on the pressure gradient in the gas. The invention more particularly indicates a way in which the pressure gradient can be made at least substantially independent of changes in the load resistance.

The invention makes use of the known method of splitting up the electrodes into a plurality of pairs of electrodes distributed along the duct, and connecting these pairs of electrodes in series as regards voltage, the positive electrode of one pair being connected in each case to the negative electrode of another pair disposed in the direction of flow.

Splitting up the positive and negative electrodes extending over the length of the duct into individual pairs of electrodes whereof the current carrying circuits are separated by connection to a load resistance associated with each pair of electrodes has been proposed in order to avoid a reduction in the specific output of the magnetohydrodynamic generator consequent upon the Hall effect. It is furthermore known to connect pairs of electrodes in series as regards voltage, in order on the one hand to reduce current loading on the leads to the electrodes, and on the other hand to produce a higher generator voltage.

The invention accordingly relates to a magnetohydrodynamic generator comprising a duct having an ionised gas flowing through it, means for producing a magnetic field extending perpendicularly to the direction in which the gas flows, and a plurality of pairs of electrodes arranged perpendicularly to the direction in which the gas flows and perpendicularly to the magnetic field, the said pairs of electrodes being connected in series as regards voltage, and being connected to a load resistance. It is characterized in that the ratio of the longitudinal distance between two pairs of electrodes connected to one another to the transverse distance between the electrodes in one pair is at least substantially equal to the ratio of the Hall voltage set up across the relevant pairs of electrodes to the purely resistive voltage set up across the electrodes in one pair.

Figure 2:
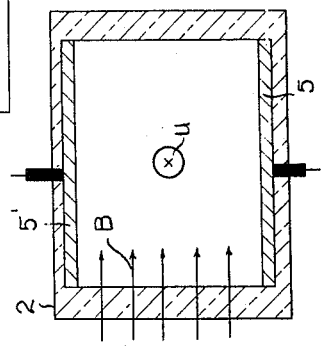

In the accompanying drawings:

FIG. 1 is a somewhat diagrammatic view of a magnetohydrodynamic generator shown in central longitudinal section; and FIG. 2 is a transverse vertical section taken on line II—II of FIG. 1.

With reference now to the drawings, the duct of the generator is indicated at 1 and is established by the four walls of a rectangular tube made from electrically insulating material. However tubes of configurations differing from rectangular can be used. Hot, ionized gas flows through the duct 1 in the direction indicated by the arrow and at a high velocity and is designated by $u$. The height of the duct 1 is designated by D. Furthermore, a magnetic field designated by B is passed through the duct 1 in a direction perpendicular to the direction of flow of the gas $u$ therethrough and this magnetic field, the directional nature of which is indicated quite clearly in FIG. 2 is produced in known manner by means which have not been illustrated.

The flow of ionised gas induces an electric field perpendicularly to the gas flow and also perpendicularly to the direction of the magnetic field, which electric field is, as is known, proportional to the product of the flow velocity $u$ and the magnetic field B. This induced voltage is then given by the product of electric field strength and duct height D.

Electrodes are installed into the walls 2 and disposed parallel to the magnetic field, and extend parallel to the magnetic field over the whole width of the walls as shown in FIG. 2. FIG. 1 of the drawing shows only the first three pairs of electrodes 3/3', 4/4', 5/5', and the last pair of electrodes 6/6'. However, such pairs of electrodes are arranged over the whole length of the duct shown. The pairs of electrodes are connected in series as regards voltage. Accordingly, the upper electrode 3' of the pair 3/3' is electrically connected to the lower electrode 4 of the pair 4/4'. In the same way, the upper electrode 4' is electrically connected to the lower electrode 5 of the pair 5/5'. The other pairs of electrodes disposed in the direction of flow are connected to one another in the same way. The connecting leads between the individual electrodes are shown diagrammatically, since they naturally have to be passed round the duct. The lower electrode 3 of the first pair 3/3' and the upper electrode 6' of the last pair 6/6' act as generator terminals, and as such are connected to the load resistance 7, which may for example be an inverter feeding a mains supply network.

The transverse distance between the electrodes in each pair is equal to the height D of the duct. The longitudinal distance of the second pair of electrodes 4/4' from the first pair of electrodes 3/3' is designated by $\alpha D$. $\alpha$ is accordingly the ratio of the longitudinal distance between two pairs of electrodes connected to one another to the transverse distance between the electrodes in one pair.

As is known, a voltage perpendicular to a strong magnetic field sets up in such a field not only a current in the same direction as the said voltage, but also a current extending perpendicularly to the magnetic field and perpendicularly to the said voltage. This effect is called the Hall effect, and the transverse voltage produced by the current is called the Hall voltage. The ratio of the voltage in the transverse direction to that in the same direction is the Hall effect factor, and is designated by $\beta$.

Thus, in the duct 1, shown in the drawing, of a magnetohydrodynamic generator, not only the purely resistive voltage, i.e. the difference between the induced and terminal voltages, appears across opposing electrodes in the direction in which current flows and perpendicularly to the gas flow, but also a Hall voltage, based on the Hall effect, perpendicular to the current in the direction in which the gas flows. This Hall voltage may, for example, be measured across two pairs of electrodes whereof the connecting lead has been broken. The ratio of Hall voltage to purely resistive voltage is between 1 and 10 in a magnetohydrodynamic generator constructed in known manner.

The invention is based on recognition of the fact that the change in gas-pressure-gradient in the duct which occurs upon a change in load resistance is related to the Hall voltage produced to the purely resistive voltage, to the longitudinal distance between two pairs of electrodes connected in series as regards voltage, and to the transverse distance between the electrodes in one pair, i.e. the change in gas-pressure-gradient upon a change in load resistance depends on $\alpha$ and $\beta$. Accordingly, if the operating magnetiudes and dimensions of a magnetohydrodynamic generator are known or calculated, and in particular also the Hall voltage and the purely resistive voltage, i.e. $\beta$, and if the gas-pressure-gradient in the duct is required to depend in a definite fashion on the load resistance in order to comply with the conditions as regards regulation of the generator, this requirement can be complied with by seeing that the value worked out for $\alpha$ in the light of the calculation is complied with when the dimensions of the duct are being determined.

Since the transverse distance between the electrodes in one pair of electrodes will in general be fixed, it follows that the longitudinal distance between two pairs of electrodes connected to one another must assume a definite value.

If the load resistance is designated by R, and a quantity proportional to the drop in gas-pressure in the duct by Y, the change in pressure-gradient upon changes in load resistance is linked by the relationship $$\frac{dY}{dR} = \frac{A \cdot Y^2}{(R+B)^2}(\beta^2 - \alpha^2)$$

wherein A and B are quantities independent of the load resistance. It is apparent from this that if $\alpha > \beta$ the drop in pressure decreases with an increase in load resistance. On the contrary, if $\alpha < \beta$ the drop in pressure increases with an increase in load resistance.

If, according to the invention, the ratio of the longitudinal distance between two pairs of electrodes connected to one another to the transverse distance between the electrodes in one of these pairs is at least substantially equal to the ratio of the Hall voltage set up across the relevant pairs of electrodes to the purely resistive voltage set up across the electrodes in one of these pairs, i.e. if $\alpha \approx \beta$, the pressure-gradient in the duct will be at least substantially independent of the load resistance. Choice of the longitudinal distance $\alpha D$ between two pairs of electrodes connected to one another can accordingly ensure that $\alpha \approx \beta$, resulting in a gas-pressure-gradient independent of changes in load. Regulation of a magneto-hydrodynamic generator is considerably facilitated by the drop in pressure being independent of changes in load. In addition, the choice of longitudinal distance $\alpha D$ always remains substantially correct, since with a given magnetic field, $\beta$ essentially depends only on the gas-pressure, which remains constant by virtue of the choice of longitudinal distance $\alpha D$.

The ratios do not change if a plurality of interspersed groups of pairs of electrodes connected in series are arranged along the duct, each group being connected to a load resistance which is electrically separate from the remaining load resistances. Such an arrangement is advantageous if the ratio $\beta$ of the Hall voltage to the purely resistive voltage is large, and the longitudinal distance $\alpha D$ between pairs of electrodes connected to one another would accordingly be large for a drop in pressure in the duct independent of changes in load. Such an interspersed group of pairs of electrodes is shown in the drawing. This group embraces the pairs of electrodes 8/8', 9/9' and further pairs of electrodes, not shown, up to the last pair 10/10' at the end of the duct. These pairs of electrodes, which are connected in series as regards voltage are connected to the load resistance 11 via the first electrode 8 and the last electrode 10', which act as generator terminals. The longitudinal distance between the pairs of electrodes 8/8' and 9/9', and also between the other pairs, is likewise $\alpha D$. There may, if required, be further groups of pairs of electrodes connected in series as regards voltage, and at a mutual longitudinal distance of $\alpha D$, the current or power output being distributed over a plurality of current-carrying circuits.

If the Hall-effect factor $\beta$ is unchanged over the whole length of the duct, it follows that with a duct of constant height D, and thus a constant transverse distance between the electrodes, there is a uniform distance $\alpha D$ between the pairs of electrodes connected to one another. However, if the factor $\beta$ changes along the duct in dependence on the location along the duct, because of either a change in the magnetic field or in the condition of the gas or both together, an altered value for the distance factor $\alpha$ must also be chosen to correspond to the value of $\beta$, in order to preserve the same effect of a change in load on the drop in pressure in the duct. This also results in a change in the distance $\alpha D$ between two pairs of electrodes with a constant duct height D. These same considerations apply to the case in which the height D is not constant along the duct. Even if $\beta$ and thus $\alpha$ are constant, the distance $\alpha D$ to be provided between two pairs of electrodes varies according to the location along the duct and the height D of the duct at this location.

I claim:

The method for operating a magnetohydrodynamic generator having a duct through which an ionized gas flows, means for producing a magnetic field extending perpendicularly to the direction of flow of the gas within said duct, and a plurality of pairs of electrodes within said duct arranged perpendicularly to said magnetic field and also perpendicularly to the direction of gas flow, the said pairs of electrodes being connected in series as regards the generated voltage and being connected to a load resistance, in order to minimize the influence of changes in load on the pressure gradient of the gas within said duct, which comprises the step of establishing a ratio of the Hall voltage set up across two pairs of electrodes, connected to one another, to the purely resistive voltage set up across the electrodes in one of such pairs which is substantially equal to the ratio of the longitudinal distance between the relevant pairs of electrodes to the transverse distance between the electrodes of one of said pairs.

References Cited by the Examiner

UNITED STATES PATENTS 3,148,291  9/1964  Rosa _____ 310—11

FOREIGN PATENTS 703,879  2/1965  Canada.

MILTON O. HIRSHFIELD, *Primary Examiner.*

DAVID X. SLINEY, *Examiner.*